Jan. 30, 1968    R. A. HANSON    3,366,021
COMPACTOR FOR SOIL SURFACES
Filed Oct. 23, 1965    5 Sheets-Sheet 1
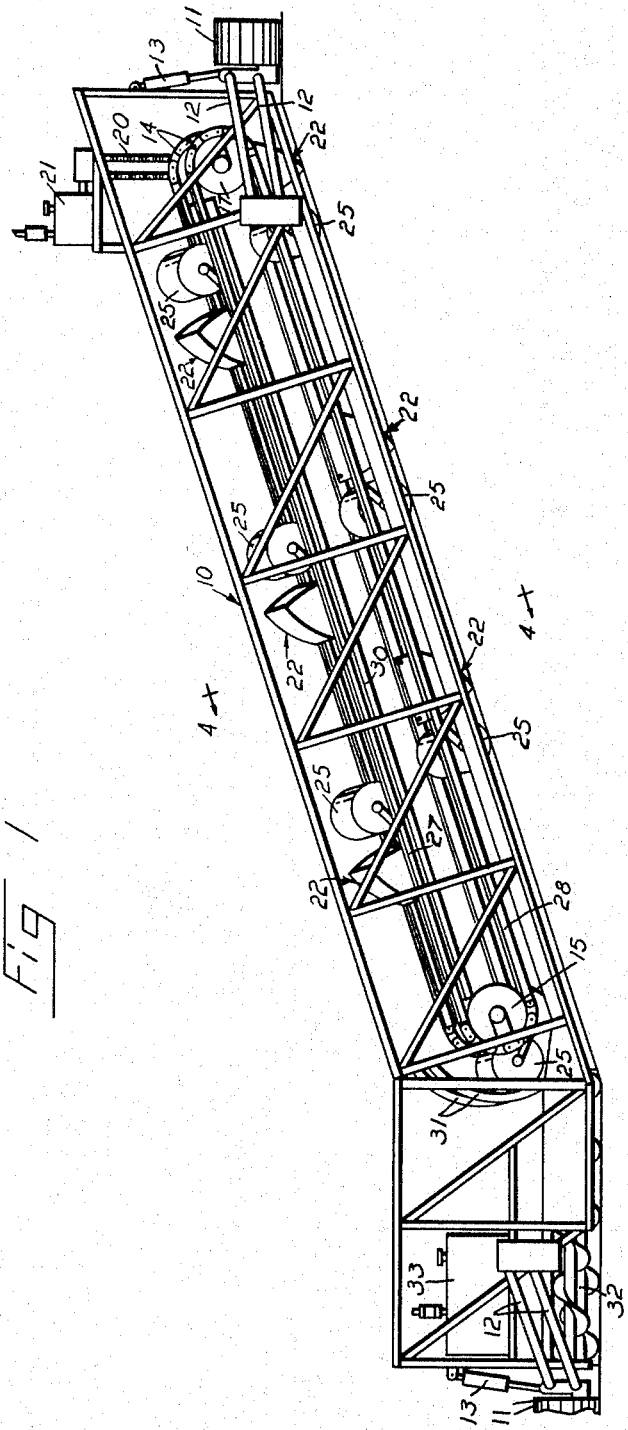
Fig 1
INVENTOR.
RAYMOND A. HANSON
BY
ATTYS.

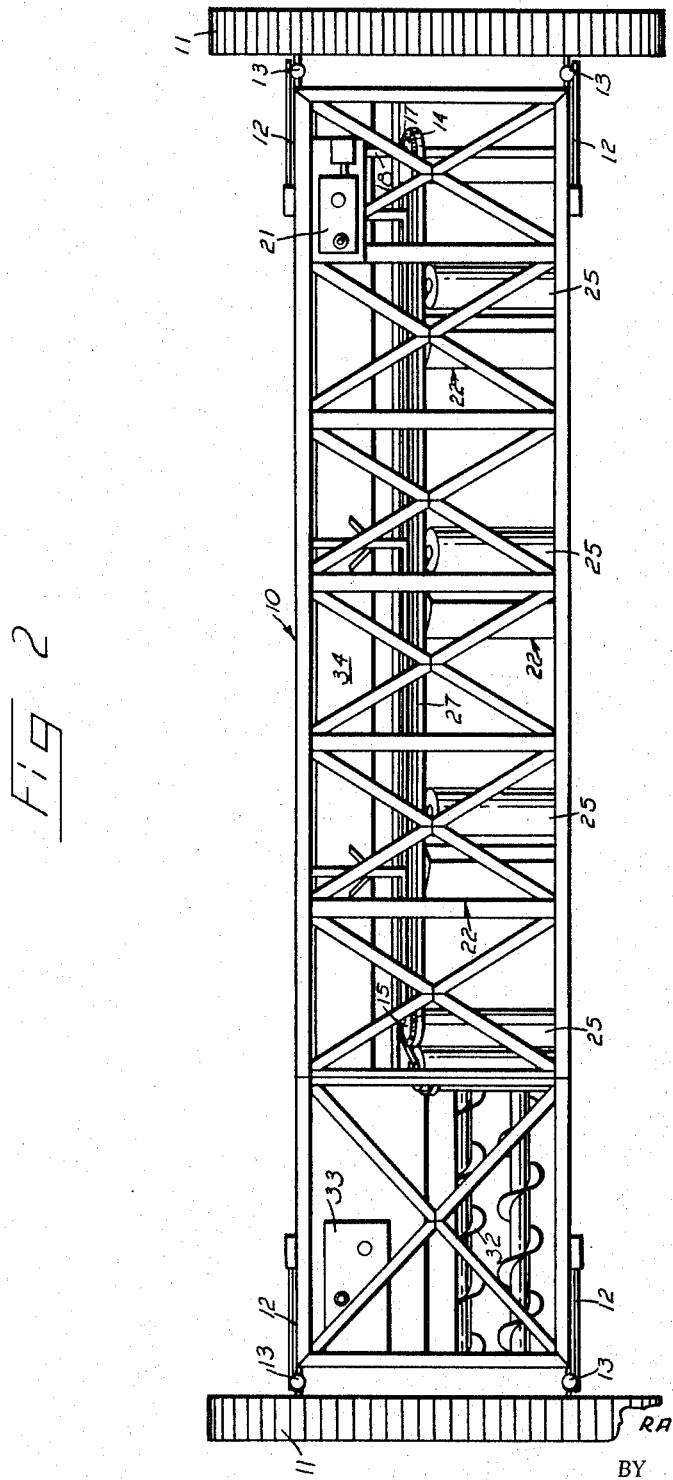

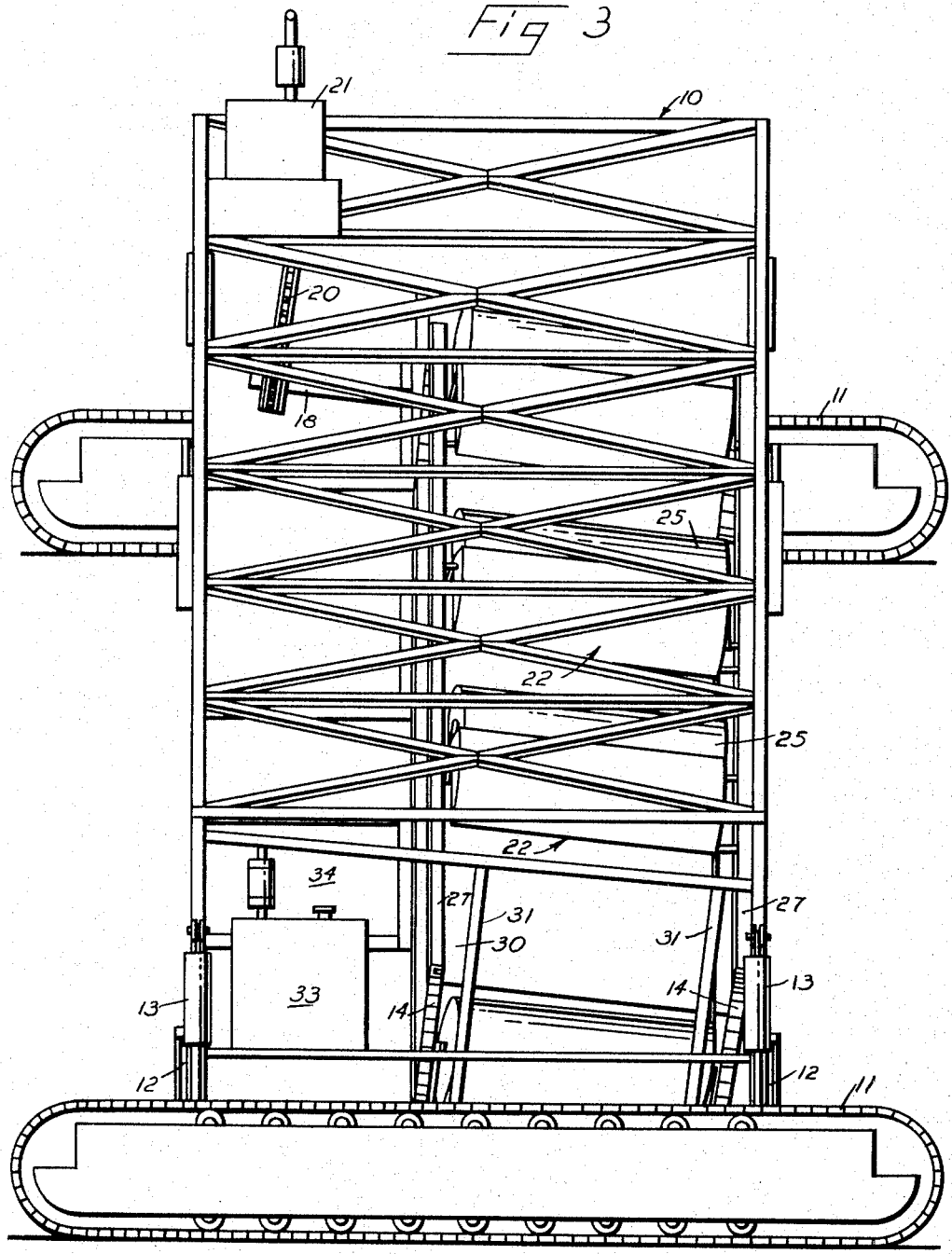

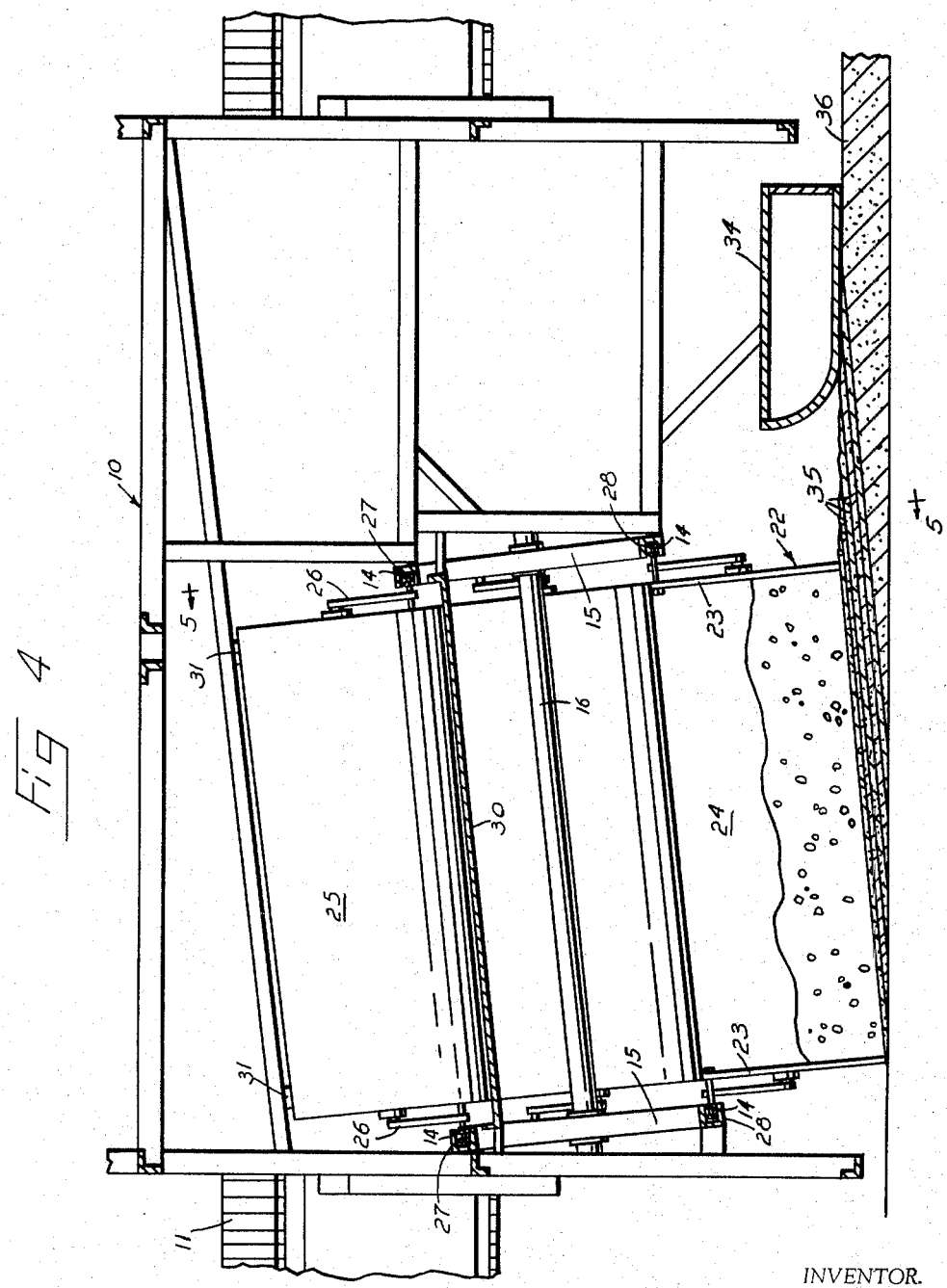

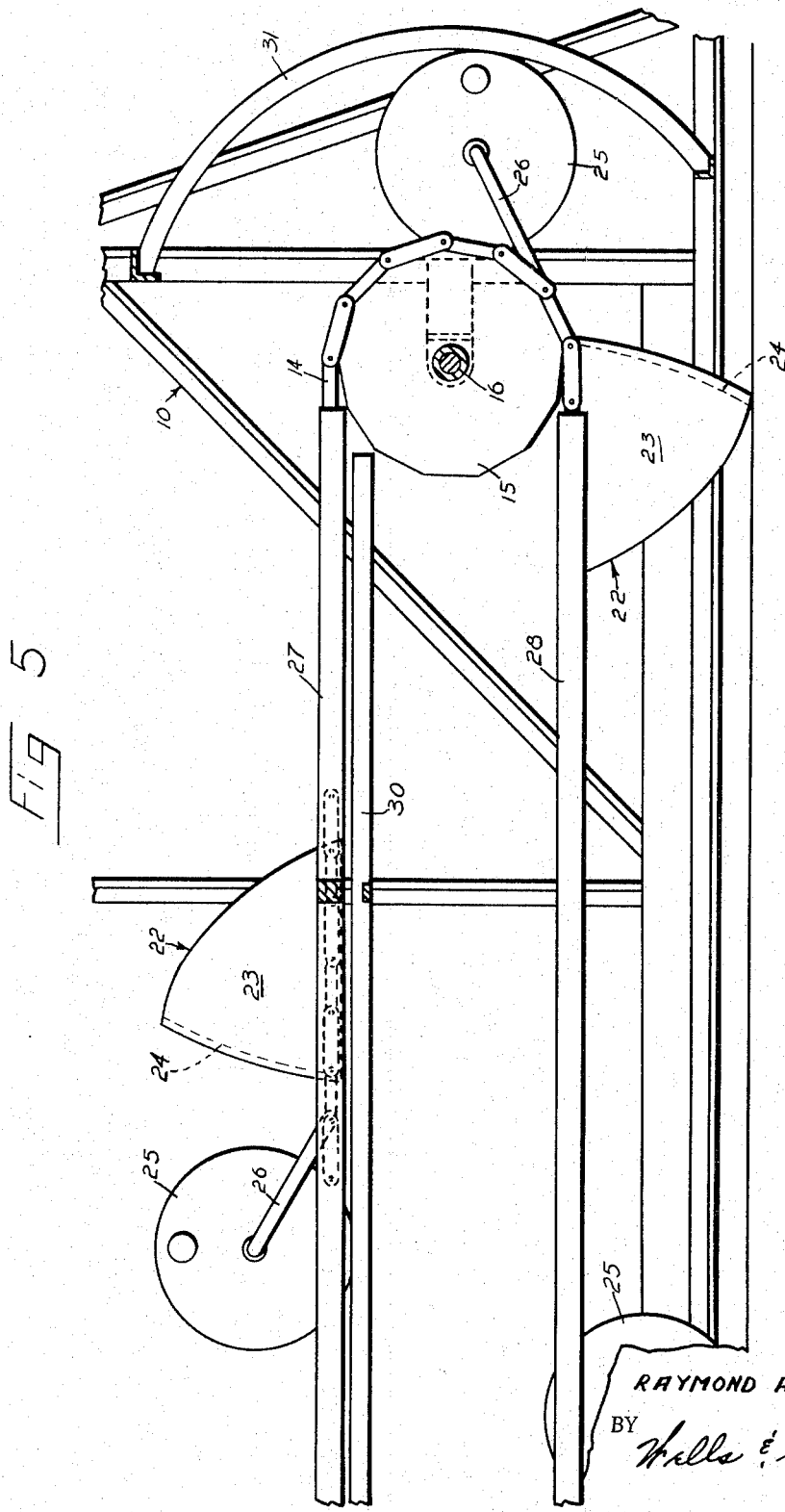

United States Patent Office 3,366,021
Patented Jan. 30, 1968

3,366,021
COMPACTOR FOR SOIL SURFACES
Raymond A. Hanson, % R. A. Hanson Company,
Palouse, Wash. 99161
Filed Oct. 23, 1965, Ser. No. 503,248
10 Claims. (Cl. 94—22)

ABSTRACT OF THE DISCLOSURE

A method of compacting a soil layer wherein parallel inclined layers are individually placed and compacted transversely of an intended path, the thin compacted layers being used to produce a uniformly-compacted thick layer of soil. A machine for accomplishing this using a continuously moving transverse spreading and compacting unit, having alternate spreading elements with longitudinally inclined spreading edges and alternated compacting rollers having parallel smoothing surfaces.

Summary of the invention

This invention relates to a method of compacting relatively thick soil layers and also to a machine for utilizing the method described and claimed herein.

The method of the invention can be summed up in two steps: (1) placing across a surface a plurality of thin overlapping soil layers, each being parallel and inclined longitudinally, and (2) compacting each layer prior to placing of a succeeding layer thereon.

The apparatus disclosed includes three basic structural components: (1) A supporting framework moving forwardly; (2) a transversely moving spreading member having a lower edge inclined upwardly and rearwardly relative to the framework movement, and (3) compacting means moving transversely behind the spreading member and having a smoothing surface parallel to the lower edge of the spreading member. In addition, the invention disclosed relates to the utilization of an endless, continuous alternation of spreading and compacting elements and the use of buckets and rollers specifically as the spreading and compacting elements respectively.

It is a first object of this invention to provide a method of effectively compacting relatively thick soil layers in a constant manner throughout the layer. It is designed for use in preparing sub-grades for highways, canals and other lined soil areas. The soil surface might later be covered with concrete or any other suitable lining material.

Conventional compacting machines are effective only on soil layers of limited thickness. When a greater thickness of compacted material is desired, it cannot be placed in a single pass of a machine using conventional compacting methods. Attempts to do so will results in a soil layer highly compacted adjacent its upper surface and lightly compacted, if at all, at its bottom elevation adjacent to the existing surface.

It is an object of this invention to provide a machine that can mechanically compact a relatively thick layer of soil by successively spreading on an existing surface a number of overlapping thin layers inclined at an acute angle so that they can be effectively compacted in an individual manner with high effectiveness.

Another object of this invention is to provide a machine relatively simple in structure, to spread and compact a thick layer of soil in one pass of the machine, the final upper surface of the layer being smoothly surfaced for subsequent operation.

These and further objects relating to the method and apparatus described herein will be evident from the following disclosure, taken together with the accompanying drawing which illustrates a preferred form of the apparatus as well as its function. It is to be understood that this form of the apparatus is only exemplary and is not intended to limit the scope of the invention defined in the appended claims.

In the drawings:

FIGURE 1 is a side elevation view of a machine embodying the present invention;

FIGURE 2 is a top view of the machine shown in FIGURE 1;

FIGURE 3 is an enlarged end elevation view of the machine as seen from the left in FIGURE 1;

FIGURE 4 is an enlarged sectional view of the machine as seen along line 4—4 in FIGURE 1;

FIGURE 5 is an enlarged fragmentary sectional view of the lower portion of the spreading and compacting apparatus as seen along line 5—5 in FIGURE 4.

The instant method can be best understood from a study of FIGURE 4. Very simply, it involves the transverse spreading of a succession of inclined overlapping thin soil layers along an existing surface, each layer being compacted immediately after being placed, so that the result is a relatively thick layer of highly compacted soil that is uniformly compressed throughout its total thickness. The inclined layers can be smoothly surfaced in a single along their upper edges after placement and compacting. A homogeneous soil layer of relatively deep thickness is finally achieved, having a surface suitable for future operations, such as reception of a lining material.

The machine for accomplishing this method is shown in the drawings. The machine illustrated is designed to compact a layer of material spread across a transversely inclined longitudinal surface, such as the side wall of a canal. The machine can equally well be adapted to a horizontal surface, such as along a highway or any other existing soil surface.

The machine is supported by a mobile rigid framework 10. The transverse ends of framework 10 are supported by two track units 11 respectively carried by parallelogram arms 12 supported on framework 10. The relative position of each track unit 11 with respect to framework 10 is governed by cylinder assemblies 13 also connected between track units 11 and framework 10. The drive mechanisms for the track units 11 and the hydraulic supply for cylinder assemblies 13 can be of any conventional type. Any suitable controls for positioning framework 10 can be utilized.

Extending along framework 10 are two endless chains 14. These transverse chains are wrapped about lower end sprockets 15 and upper end sprockets 17 respectively fixed to shafts 16 and 18. Shafts 16, 18 are suitably carried on framework 10 by bearings or other rotational support devices.

As can be seen in FIGURES 3 and 4, shafts 16, 18 are inclined in a rearward and upward direction from their forward ends toward the back of the machine. The angle of inclination is not particularly great, being generally an acute angle. The angle must normally be less than the angle of repose of the material being spread.

Upper shaft 18 is powered by a driving chain 20 which in turn is moved by a conveyor engine 21 at the upper end of the machine (FIGURES 1, 2 and 3). The direction of movement imparted to chains 14 is such that their lower flights move upwardly or to the right in FIGURE 1 and the upper flights move downwardly or to the left in FIGURE 1.

Supported between chains 14 are a series of longitudinally spaced buckets 22. Each bucket 22 has front and rear rigid sidewalls 23 and a connecting transverse wall 24 which is generally arcuate (FIGURE 5). The sidewalls 23 are pinned to the chains 14 at their respective sides, this connection being made through suitable slots in the sidewalls 23 to permit chains 14 to pass over the sprockets 15 and 17. The walls 24 of each bucket, when carried along the lower flights of chains 14, have a lower edge that extends from a forward end directly adjacent to the existing surface line to an upwardly and rearwardly located upper end at the elevation of the final surface plane of the finished compacted layer.

Immediately rearward of each bucket 22 in the direction of movement of the chains 14 is a transverse roller 25 carried by support arms 26 at each of its ends. Arms 26 rotatably carry rollers 25 and are pivotally connected to the respective chains 14. Rollers 25 are therefore free to move vertically along the lower flights of chains 14 so as to effectively compress each layer of soil as it is deposited by movement of a bucket 22.

The chains 14 are guided along their respective flights by upper chain guides 27 and lower chain guides 28. Guides 27, 28 maintain the chains 14 in their desired straight paths intermediate the sprockets 15 and 17. In addition, the rigid upper pan 30 is fixed on framework 10 directly beneath the upper flights of chains 14 to provide rolling support for the heavy rollers 25 during their return along the upper flights of chains 14 (FIGURE 4). It is to be noted that buckets 22, rollers 25, chains 14 and all of their associated devices are inclined an equal amount, as is clear from FIGURE 4.

As rollers 25 pass upwardly over the upper sprockets 17, they will automatically be pulled over the upper end of the pan 30 and then roll downwardly along the upper surface of pan 30. This relieves chains 14 of the weight of rollers 25 except where the chains 14 are fully supported by sprockets 17. In order to prevent rollers 25 from falling freely as chains 14 pass over the lower sprockets 15, there are provided fixed guide rods 31 (FIGURE 5) which are arcuate and centered about the axis of lower shaft 16. The proximity of rods 31 to the sprockets 15 is such as to limit the freedom of movement of rollers 25 while in contact therewith. Rollers 25 will therefore be temporarily supported by rods 31 and brought into gradual contact with the forming layers of soil at the bottom end of framework 10.

Soil for the desired layers is supplied to buckets 22 at the lower end of framework 10. A forward portion of the lower end of framework 10 is open for the reception of soil, which can be placed therein by conveyors, trucks or any other suitable device. Feed augers 32 are shown rotatably mounted on framework 10 to move soil towards the lower ends of the chains 14, so that the soil can be scooped by the constantly moving buckets 22. An engine 33 is shown at the lower end of framework 10 to supply power for the augers 32.

After the successive overlapping soil layers have been placed in their obliquely inclined positions during forward movement of framework 10, the resulting surface will be slightly roughened due to the nature of the material. A finish screed is shown at 34 in a fixed position relative to framework 10. Its purpose is to smoothly trowel and finish the upper surface of the final desired thick layer. Any suitable type of finishing blade or device could be substituted in place of screed 34.

The operation of the machine in the method previously described is continuous and mechanically quite simple. The chains 14 are continuously moved as previously indicated, with the lower flights of chains 14 moving upwardly as shown in FIGURE 1. The material to be spread, whether soil or other material, is supplied to buckets 22 at the lower end of the machine by the feed augers 32, whose speed must be timed relative to the movement of the machine and to the movement of chains 14. Each bucket 22 receives sufficient soil to spread the soil along a single layer 35 across the full width of the machine. As the layer is being spread (FIGURE 4), the roller 25 associated with the bucket spreading the layer will compact that layer of soil in the same inclined plane in which it was placed. The layer of soil will be compacted consistently across its entire face and therefore along its entire elevation. Each bucket 22 will place another thin layer of inclined material after placement. The machine can be moved constantly in a longitudinal direction, the relationship between the forward speed of the machine and the speed of the buckets being such that each layer will be properly placed in an overlapping relationship so that the upper edges of the layer will be in a common plane. Finally, the compacted layers are smoothed over by the screed 34 or other finishing device to produce that final highly compacted layer of material designated in FIGURE 4, by numeral 36.

The basic method involved in this invention is comprised of the steps of placing inclined layers of material one on top of the other in overlapping fashion, each layer being compacted across its entire surface to produce a relatively thick layer of material that is consistently compacted throughout its elevation. The machine described is only exemplary of the type of machine that can be used. Many modifications could be made in bucket design, compacting rollers and other devices used in practicing this method and in the design of the supporting framework and mechanisms. For these reasons, only the following claims are intended to restrict or limit the scope of my invention.

Having thus described my invention, I claim:

1. A method of firmly compacting a relatively thick layer of soil placed upon an original longitudinal surface comprising the following steps:

placing upon the original surface a succession of transverse relatively thin overlapping soil layers, each layer being parallel and inclined longitudinally relative to the original surface;

and compacting each layer across the total surface area thereof prior to placement of the succeeding layer.

2. A method as defined in claim 1, further comprising:

finishing the top edges of the compacted individual layers along a common plane spaced above and parallel to the original surface.

3. A method as defined in claim 1 wherein each layer is compacted across its full face area in a direction substantially perpendicular to the layer.

4. An apparatus for spreading and compacting material along an original surface, comprising:

a mobile framework adapted to travel over the original surface in a forward direction;

a spreading member on said framework adapted to deposit successive overlapping layers of material transversely across the original surface during forward movement of said framework, said spreading member being movably mounted on said framework for transverse movement relative thereto and having a lower edge, inclined upwardly and rearwardly from the original surface relative to movement of said framework;

and compacting means movably mounted on said framework for transverse movement relative thereto, said compacting means comprising a smoothing element positioned rearwardly of the spreading member in the direction of movement of said member relative to said framework, said smoothing element having a lower surface positioned parallel to the lower edge of said spreading member adapted to compact each layer of material after the layer is deposited by said spreading member.

5. An apparatus as defined in claim 4, further comprising:

surface means on said framework rearward of said spreading member and compacting means to smooth the upper edges of the material layers in a common plane.

6. An apparatus as defined in claim 4, further comprising:

material feed means at one end of said machine adapted to feed material to said spreading member.

7. An apparatus for spreading and compacting material along an original surface, comprising:
a mobile framework adapted to travel over the original surface in a forward direction;
spreading means on said framework to deposit successive overlapping layers of material transversely across the original surface during forward movement of said framework, the layers deposited being inclined upwardly and rearwardly from the original surface relative to movement of said framework;
and compacting means on said framework to compact each layer of material after the layer is deposited by said spreading means;
said spreading means and compacting means are mounted on endless supporting chain elements directed across said framework in transverse horizontal flights;
said spreading means comprising a series of longitudinally spaced buckets along the length of said chains having a width equal to the desired with of the individual layer of material spread thereby;
said compacting means comprising rollers mounted immediately rearward of each bucket along the lengths of said chains relative to the direction of movement of said chains relative to said framework, said rollers being freely movable in a vertical direction along the lower flights of said chains.

8. An apparatus as defined in claim 7, further comprising:
feed means on said framework to supply sufficient material to each of said buckets at one side of said machine to insure spreading of a complete layer of material across the width of said machine during each passage of each of said buckets.

9. An apparatus fof spreading and compacting material along an original surface, comprising:
a framework supported by the original surface adapted to travel over the original surface in a forward direction;
spreading means movably carried on said framework for motion relative to said framework in a direction transverse to the forward movement of said framework, said spreading means including a blade having a lower edge inclined upwardly and rearwardly from its forward end;
compacting means having a material compacting surface parallel to the lower edge of said spreading means, said compacting means being mounted on said framework for translational movement conjointly with said spreading means;
and material supply means on said framework to feed material to said spreading means for distribution across the width of said original surface.

10. An apparatus for spreading and compacting material along an original surface, comprising:
a framework adapted to travel in a forward direction along a longitudinal path;
a transverse conveyor machanism on said framework having a working flight adjacent to the surface on which the layer is to be spread and a continuous return flight;
said conveyor mechanism comprising successive spreading and compacting units arranged in longitudinally spaced positions, each unit comprising:
spreading blade means having an inclined lower edge extending rearwardly and upwardly from its forward end to spread a layer of material on the original surface;
and soil compacting means mounted on said conveyor mechanism rearwardly adjacent to said blade means relative to the direction of movement of said transverse conveyor to compress soil deposited by said blade means.

References Cited
UNITED STATES PATENTS

| | | | |
|---|---|---|---|
| 1,471,760 | 10/1923 | Ursino | 94—50 X |
| 1,550,027 | 8/1925 | Hug | 94—50 |
| 1,559,406 | 10/1925 | Carson | 94—50 |
| 1,683,382 | 9/1928 | Carr | 94—50 |
| 1,700,797 | 2/1929 | Hebden | 94—50 |
| 2,090,959 | 8/1937 | Jackson | 94—44 X |
| 3,242,835 | 3/1966 | Paramythioti | 94—50 |

ERNEST R. PURSER, *Primary Examiner.*

NILE C. BYERS, *Examiner.*